(12) United States Patent
Basu et al.

(10) Patent No.: US 7,859,999 B1
(45) Date of Patent: Dec. 28, 2010

(54) MEMORY LOAD BALANCING FOR SINGLE STREAM MULTICAST

(75) Inventors: Debashis Basu, San Jose, CA (US); Avanindra Godbole, San Jose, CA (US); Raymond M. Lim, Los Altos Hills, CA (US); Jeffrey G. Libby, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 641 days.

(21) Appl. No.: 11/858,323

(22) Filed: Sep. 20, 2007

Related U.S. Application Data

(63) Continuation of application No. 10/208,008, filed on Jul. 31, 2002, now Pat. No. 7,292,529.

(51) Int. Cl.
H04L 12/26 (2006.01)
H04L 12/56 (2006.01)
H04J 3/24 (2006.01)

(52) U.S. Cl. .................. 370/230; 370/235; 370/412; 370/474

(58) Field of Classification Search .................. 370/230, 370/235, 412, 474
See application file for complete search history.

(56) References Cited

U.S. PATENT DOCUMENTS

| | | | |
|---|---|---|---|
| 5,305,311 A | 4/1994 | Lyles | |
| 6,128,278 A | 10/2000 | Joffe et al. | |
| 6,185,206 B1 | 2/2001 | Nichols et al. | |
| 6,310,875 B1 | 10/2001 | Nichols et al. | |
| 6,359,884 B1 * | 3/2002 | Vincent | 370/389 |
| 6,504,842 B1 | 1/2003 | Bergenfeld | |
| 6,556,542 B1 | 4/2003 | Sudo et al. | |
| 6,636,510 B1 | 10/2003 | Lee et al. | |
| 6,687,247 B1 | 2/2004 | Wilford et al. | |
| 6,751,219 B1 | 6/2004 | Lipp et al. | |
| 6,754,211 B1 | 6/2004 | Brown | |
| 6,788,684 B2 | 9/2004 | Makishima et al. | |
| 6,788,697 B1 | 9/2004 | Aweya et al. | |
| 6,851,008 B2 | 2/2005 | Hao | |
| 6,873,627 B1 | 3/2005 | Miller et al. | |
| 7,006,495 B2 | 2/2006 | Hooper | |
| 7,054,962 B2 | 5/2006 | Fidler | |
| 7,061,909 B2 | 6/2006 | Blanc et al. | |
| 7,415,477 B2 * | 8/2008 | Devadas et al. | 1/1 |
| 7,430,169 B2 * | 9/2008 | Allen et al. | 370/235 |
| 2003/0009560 A1 * | 1/2003 | Venkitaraman et al. | 709/226 |
| 2003/0026268 A1 | 2/2003 | Navas | |

OTHER PUBLICATIONS

Debashis Basu et al.; Memory Load Balancing for Single Stream Multicast; U.S. Appl. No. 10/208,008, filed Jul. 31, 2002; 28 pages.

* cited by examiner

*Primary Examiner*—Alpus H Hsu
(74) *Attorney, Agent, or Firm*—Harrity & Harrity, LLP

(57) ABSTRACT

A system for multicasting a packet of data to a single data stream is provided. The system may determine a size of the packet and may send a single copy of the packet if the size of the packet exceeds a threshold value. A number of copies of the packet yet to be multicast may be ascertained if the size of the packet of data does not exceed the threshold value. Copies of the packet may be transmitted based on the number of copies of the packet yet to be multicast.

22 Claims, 5 Drawing Sheets

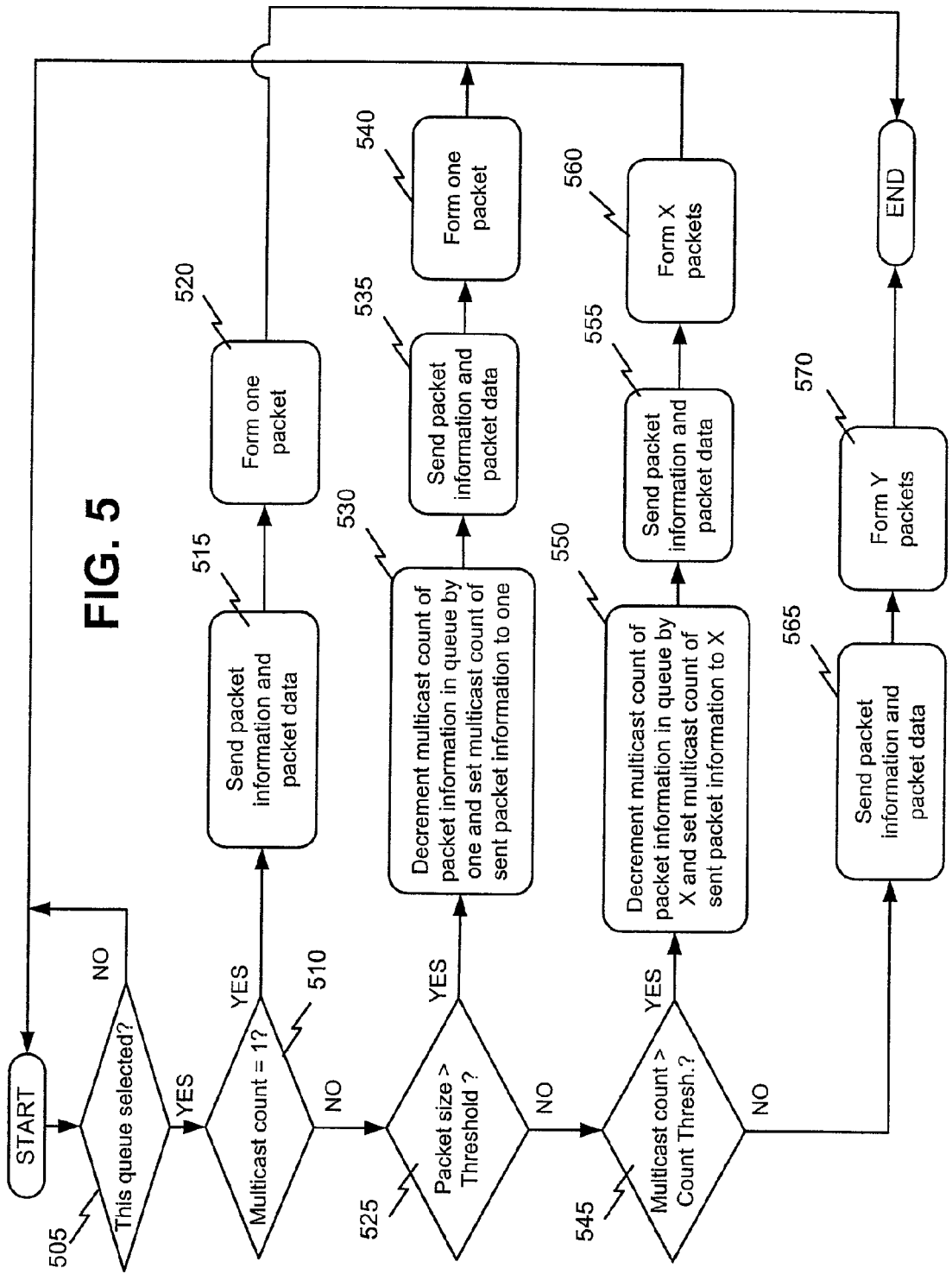

MEMORY LOAD BALANCING FOR SINGLE STREAM MULTICAST

RELATED APPLICATION

This application is a continuation of U.S. patent application Ser. No. 10/208,008 filed Jul. 31, 2002, the disclosure of which is incorporated herein by reference.

BACKGROUND OF THE INVENTION

1. Field of the Invention

The present invention relates generally to data transfer and, more particularly, to systems and methods for multicasting packets of information.

2. Description of Related Art

Routers receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed. Purpose-built routers were planned and constructed with components optimized for routing. They not only handled higher line rates and higher network traffic volume, but also added functionality without compromising line rate performance.

A purpose-built router may include a number of input and output ports from which it transmits and receives information packets. A switching fabric or other transmission medium may be implemented in the router to carry the packets between the ports. In a high-performance purpose-built router, the switching fabric may transmit a large amount of information between a number of internal components.

Typically, purpose-built routers may be required to "multicast" information (i.e., send the same data from one source to multiple receivers). One type of multicast is a "single stream multicast," in which a copy of the same packet is sent to different logical interfaces (e.g., different frame relay or virtual LAN) that are all part of the same physical interface. However, the nature of multicasting may place uneven demands on certain resources within the router. Also, multicasting may adversely impact the quality of service (i.e., the performance, such as transmission rates and error rates, of a communications channel) of the router.

Thus, there is a need in the art to more efficiently implement multicasting within routers.

SUMMARY OF THE INVENTION

Systems and methods consistent with the principles of the invention may, among other things, assemble a single copy of a packet of data at a time for multicasting to a single stream of data if a number of data units associated with the packet exceeds a threshold. If the number of data units is less than or equal to the threshold, multiple copies of the packet may be assembled from the data units for single stream multicast.

In accordance with one purpose of the invention as embodied and broadly described herein, a method for multicasting a packet of data to a single data stream may include determining a size of the packet and sending a single copy of the packet if the size of the packet exceeds a threshold value. A number of copies of the packet yet to be multicast may be ascertained if the size of the packet of data does not exceed the threshold value. Copies of the packet may be transmitted based on the number of copies of the packet yet to be multicast.

In another implementation consistent with principles of the invention, a method for multicasting a packet of data to a single stream of data may include determining whether a number of units of data associated with a packet of data exceeds a threshold and outputting the units of data associated with the packet from a memory. The units of data may be assembled into a single packet if the number of units of data exceeds the threshold. The units of data may be formed into a plurality of packets if the number of units of data does not exceed the threshold.

In still another implementation consistent with principles of the invention, a network device may include a memory system. The memory system may include a packet information memory configured to output packet information including a multicast count, and a data memory configured to output data associated with the packet information. A processing unit may be coupled to the memory system and may be configured to assemble one or more packets of information from the packet information and the data. A number of packets of information assembled from the packet information and the data may depend on at least one of a multicast count of the packet information and a size of the data associated with the packet information.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a flow chart illustrating processing performed by the dequeue engine and packet assembler in FIG. 4 according to an implementation consistent with the principles of the invention.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation, a processing unit may assemble a single packet of data at a time for multicasting to a single stream of data if the number of data units associated with the packet exceeds a threshold. If the number of data units is less than or equal to the threshold, the processing unit may sequentially assemble multiple packets from the data units.

Exemplary Network Device Configuration

Figure 1:
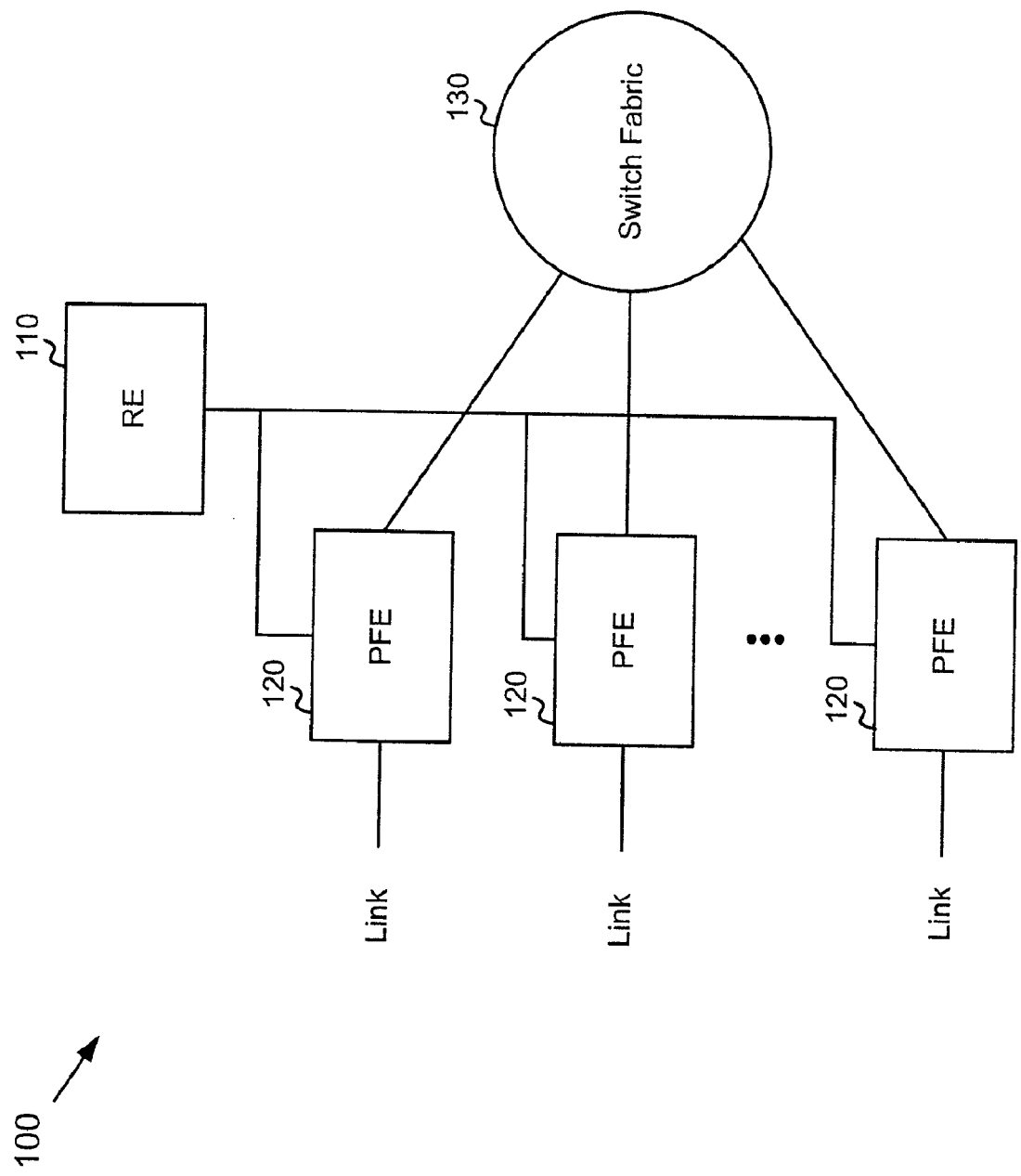
FIG. 1 is a diagram of an exemplary network device in which systems and methods consistent with the principles of invention may be implemented.

FIG. 1 is a diagram of an exemplary network device in which systems and methods consistent with the principles of the invention may be implemented. The principles of the invention will be described in terms of packets, but the principles also apply to the flow of any type of data unit. In this particular implementation, the network device takes the form of a router 100. The router 100 may receive one or more data streams from a physical link, process the data stream(s) to determine destination information, and transmit the data stream(s) on one or more links in accordance with the destination information.

Router 100 may include a routing engine (RE) 110 and multiple packet forwarding engines (PFEs) 120 interconnected via a switch fabric 130. Switch fabric 130 may include one or more switching planes to facilitate communication between two or more of PFEs 120. In an implementation consistent with the principles of the invention, each of the switching planes includes a three-stage switch of crossbar elements.

RE 110 may include processing logic that performs high level management functions for router 100. For example, RE 110 may communicate with other networks and systems connected to router 100 to exchange information regarding network topology. RE 110 may create routing tables based on the network topology information and forwarding tables based on the routing tables. RE 110 may forward the forwarding tables to PFEs 120. PFEs 120 may use the forwarding tables to perform route lookup for incoming packets. RE 110 may also perform other general control and monitoring functions for router 100.

Each of PFEs 120 connects to RE 110 and switch fabric 130. PFEs 120 receive data on physical links. Physical links may be, for example, connected to a network, such as a wide area network (WAN) or a local area network (LAN) or connected to a network device. Each physical link could be one of many types of transport media, such as optical fiber or Ethernet cable. The data on the physical link is formatted according to one of several protocols, such as the synchronous optical network (SONET) standard, asynchronous transfer mode (ATM) technology, or Ethernet.

Figure 2:
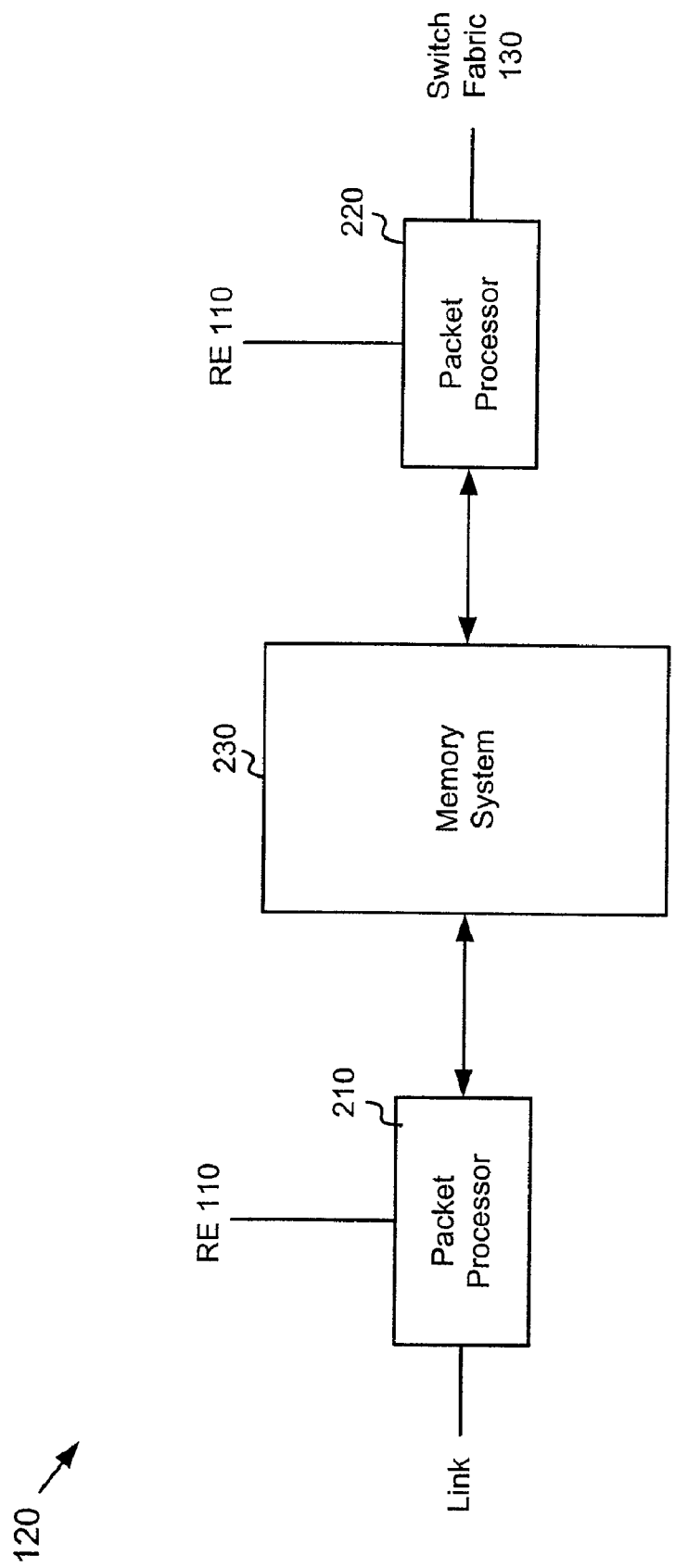
FIG. 2 is an exemplary diagram of a packet forwarding engine (PFE) of FIG. 1 according to an implementation consistent with the principles of invention.

FIG. 2 is an exemplary diagram of a PFE 120 according to an implementation consistent with the principles of the invention. PFE 120 may include two packet processors 210 and 220 connected to a memory system 230 and RE 110. Packet processor 210 connects to physical links. Packet processor 210 may process packets received from the links and prepare packets for transmission on the links. For example, packet processor 210 may perform route lookup based on packet header information to determine destination information for the packets. For packets received from the links, packet processor 210 may store data in memory system 230. For packets to be transmitted on the links, packet processor 210 may read data from memory system 230. Packet processor 210 may include a buffer or cache (not shown) to temporarily store data read from memory system 230.

Packet processor 220 connects to switch fabric 130. Packet processor 220 may process packets received from switch fabric 130 and prepare packets for transmission to switch fabric 130. For packets received from switch fabric 130, packet processor 220 may store data in memory system 230. For packets to be transmitted to switch fabric 130, packet processor 220 may read data from memory system 230. Packet processors 210 and 220 may store packet data and other packet information, such as control and/or address information, within separate portions of memory system 230.

Figure 3:
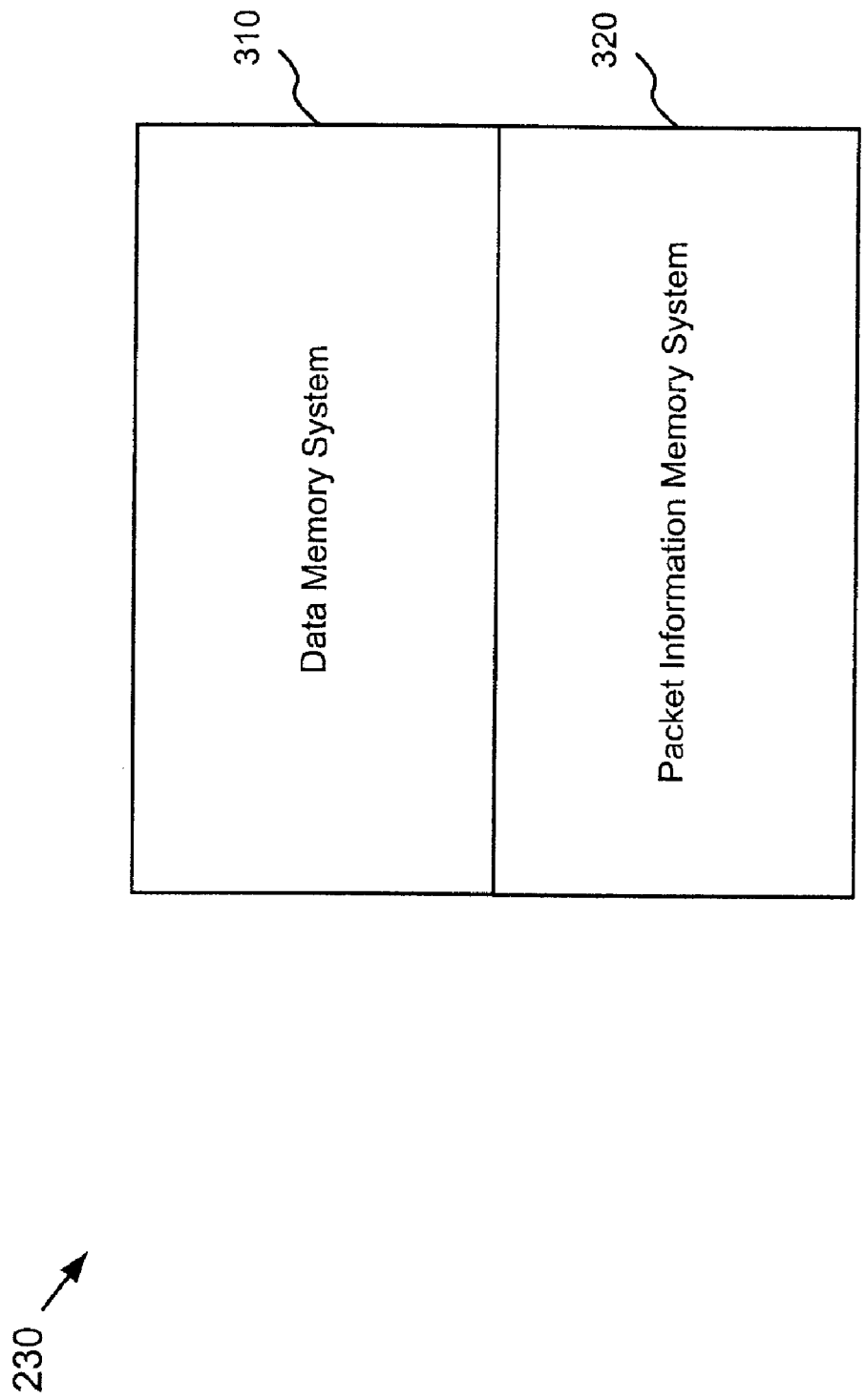
FIG. 3 is an exemplary diagram of a portion of the memory system of FIG. 2 according to an implementation consistent with the principles of the invention.

FIG. 3 is an exemplary diagram of a portion of memory system 230 according to an implementation consistent with the principles of the invention. In FIG. 3, memory system 230 includes a data memory system 310 and a packet information memory system 320. Data memory system 310 may store the data from a packet possibly in non-contiguous locations. Data memory system 310 may include a number of separate banks of memory. In one implementation, data memory system 310 includes four separate banks of memory (not shown), and packet processors 210 and 220 may be configured to spray units of data from a packet (referred to as "cells" of data) sequentially among the four banks of data memory system 310. Packets from each interface are "cellified" (i.e., formed into cells of data) and sprayed in round-robin manner to all the physical memory banks of data memory system 310. This better utilizes DRAM bandwidth by keeping all the banks equally busy while writing. The same also will be true during read from the data memory system 310 when the cells are combined to form the packet. A cell of data may be, for example, 64 bytes in length. If, for example, all data from a given packet of information occupies only one cell, the cell may reside in only one of the four banks of data memory system 310. If data from a given packet of information occupies four or more cells, however, the cells may be sprayed more or less uniformly across the four banks of data memory system 310.

Packet information memory system 320 may store the corresponding packet information in queues based on, for example, the packet stream to which the packet information corresponds. Other information, such as destination information and terms of service (TOS) parameters for the packet, may be used in determining the particular queue(s) in which to store the packet information.

Figure 4:
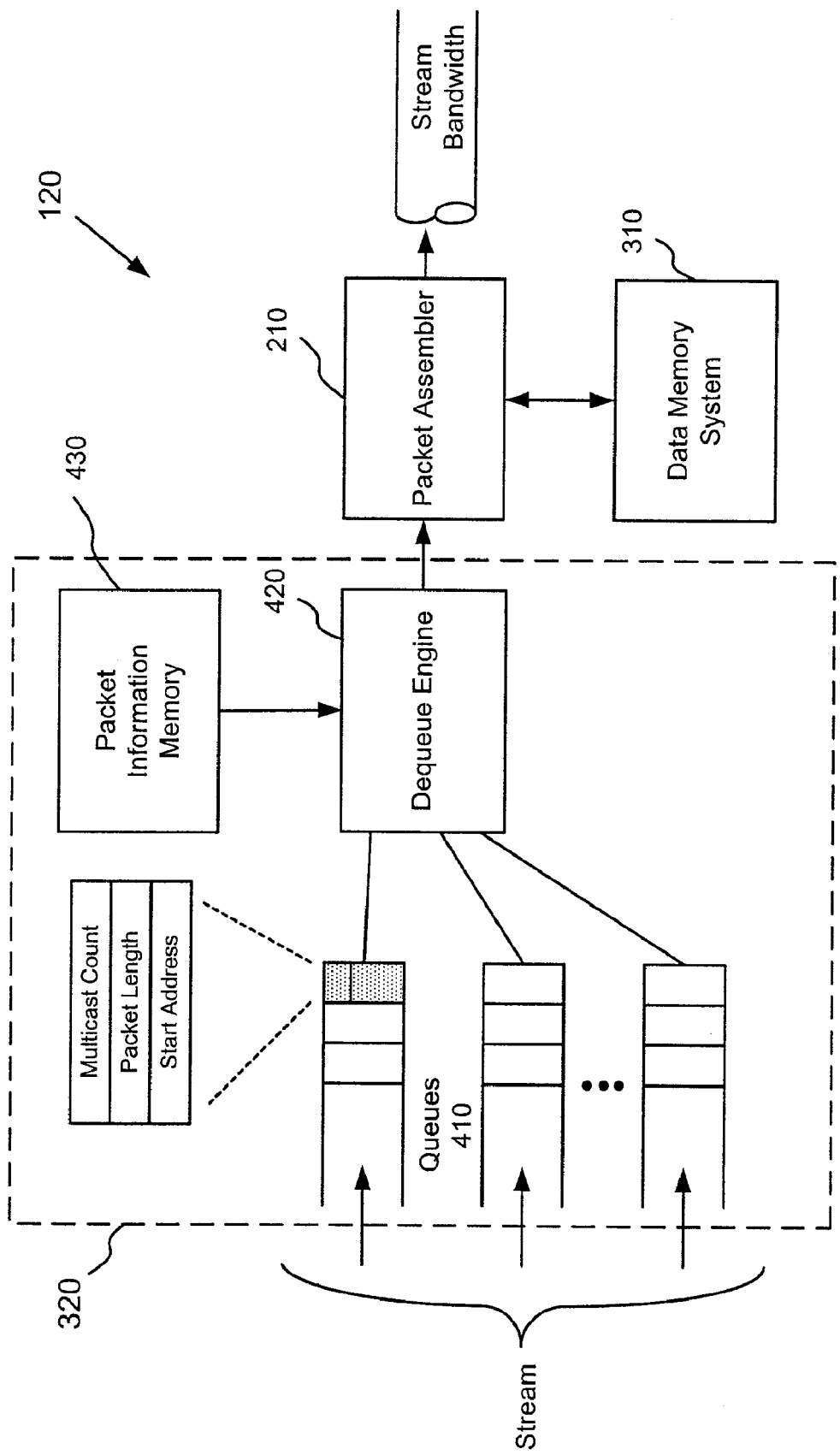
FIG. 4 is an exemplary diagram of a portion of the PFE of FIG. 1 according to an implementation consistent with the principles of the invention.

FIG. 4 is an exemplary diagram of a portion of PFE 120 according to an implementation consistent with the principles of the invention. In FIG. 4, packet information memory system 320 includes queues 410, a dequeue engine 420, and a packet information memory 430. The packet information memory system 320 is connected to a packet assembler portion of the packet processor 210 (hereinafter "packet assembler 210"), which is connected to the data memory system 310. Packet information memory system 320 may concurrently store packet information corresponding to multiple, independent packet streams. In an implementation consistent with the principles of the invention, memory system 320 may contain separate queues 410 and dequeue engines 420 corresponding to each of the packet streams. In other implementations, dequeue engine 420 may service multiple streams.

Queues 410 may include a group of first-in, first-out (FIFO) buffers that corresponds to a single stream. Other queues (not shown) may be provided for other packet streams. Queues 410 share the bandwidth of a single packet stream. Each of queues 410 may be allocated a static amount of packet information memory system 320 at configuration time. The amount of packet information memory system 320 allocated to a particular queue may be determined based on estimated worst case traffic to minimize the chance that the queue will overflow.

Each of queues 410 may have a number of parameters associated with it, such as a priority parameter PR that is either HI or LO, and a rate-control parameter RC that is either ON or OFF. The PR parameter specifies which of two priority levels (HI or LO) is associated with a queue. In other implementations, there may be more than two priority levels. Queues 410 associated with a HI priority may be serviced before queues 410 associated with a LO priority. Queues 410 at the same priority level may, for example, be serviced in a round robin manner. The RC parameter determines whether a queue is allowed to oversubscribe (i.e., output more packet information than its statically allocated bandwidth). If RC is OFF, then the queue is permitted to send up to the stream bandwidth B.

As shown in FIG. 4, the packet information at the respective heads of queues 410 may have a "multicast count" associated with it. This multicast count may be stored in a register, and may specify a number of copies of the packet that corresponds to the packet information to be sent on the stream of data. The multicast count of a packet may range from one (for a packet that will only be sent once) to, for example, 1024. The packet information may also contain the length of the packet and a start address of the packet in data memory system 310.

Dequeue engine 420 may include logic that dequeues packet information from queues 410. The order in which the streams are examined by dequeue engine 420 is referred to as the service discipline. For example, the service discipline may include round robin or time division multiplexing techniques. For each examination of a stream, dequeue engine 420 may select one of queues 410 and dequeue packet information from it. To select the queue, dequeue engine 420 may use, for example, the queue parameters PR and RC. For each dequeue operation, the corresponding packet data (i.e., cells) in data memory 310 may be read out and processed according to the size of the packet and the multicast count of the packet.

Packet information memory 430 may reside within the packet information memory system 320 and may store additional packet information corresponding to the information in the queues 410. For dequeue operations, the corresponding packet information in packet information memory 430 may be read out and sent to the packet assembler 210 along with the packet information at the head of the queue 410 that is being dequeued.

Multicast Operation

Dequeue engine 420 in combination with, for example, packet assembler 210 may multicast a packet of information on the same stream of data. Such an operation may be referred to as a "single stream multicast." One way to perform single stream multicast is for dequeue engine 420 to sequentially multicast all copies of the packet of information corresponding to the selected queue 410 during a single dequeue operation. However, such a scheme may result in (1) an imbalance in reading from data memory 310 (e.g., continually reading data from only one or two banks of data memory 310 thereby reducing overall performance), and (2) reduced quality of service (QoS) by blocking other packets having a high priority. To reduce the likelihood of such blocking, a relatively small number of copies should be multicast at one time.

FIG. 5 is a flow chart illustrating processing that may be performed by dequeue engine 420 and packet processor 210 to effect single stream multicast of a packet in an implementation consistent with the principles of the invention. FIG. 5 details the processing of packet information at the head of one queue 410.

Processing may begin with the selection of a particular queue 410 for a dequeue operation [act 505]. A particular queue among queues 410 may be selected based on, for example, round-robin or other arbitration schemes. If another queue 410 is selected (other than the particular queue of interest), no processing is performed for the queue of interest by the dequeue engine 420. Instead, dequeue engine 420 processes the packet at the head of the selected queue.

Dequeue engine 420 may determine whether the packet corresponding to the packet information in queue 410 is to be sent more than once or only once (i.e., multicast or not) [act 510]. In one implementation consistent with the principles of the invention, dequeue engine 420 may determine if the multicast count of the packet information equals one, indicating that the associated packet will be sent once. Other implementations are possible. For example, the packet information may contain one or more bits separate from the multicast count that indicate whether or not the associated packet will be multicast. In such an alternate implementation, these bits may be examined in act 510 to determine whether the packet will be sent only once.

If the multicast count equals one, dequeue engine 420 may send the packet information from the particular queue 410 and any associated information from packet information memory 430 to packet assembler 210 [act 515]. The packet information may be sent without any change in its multicast count, and packet processor 210 may store the packet information and data in its buffer.

Packet processor 210 may obtain the associated packet data from data memory system 310 and form a single packet from the packet information and data (because the multicast count of the packet information is one) [act 520]. Once the packet has been formed, and because the multicast count was one, processing is completed for the packet information at the head of the queue of interest [END in FIG. 5].

If the multicast count is greater than one, dequeue engine 420 may compare the size of the data in data memory system 310 that is associated with the packet information in the particular queue 410 with a threshold packet size [act 525]. In one implementation consistent with the principles of the invention, the threshold packet size may be four cells of data (e.g., one or more cells in each bank of data memory system 310). The packet size threshold may be relatively small (e.g., four cells) to reduce the needed buffer space in packet assembler 210, because packet assembler 210 should have sufficient buffer space for each stream executing a single stream multicast.

If the size of the data associated with the packet information in the queue 410 exceeds the threshold packet size, dequeue engine 420 may decrement the multicast count of the packet information in queue 410 by one, copy the packet information, and set the multicast count of the copied packet information to one [act 530]. Dequeue engine 420 may send the copied packet information and any associated information from packet information memory 430 to packet assembler 210 [act 535]. Because the packet information may be sent at least once more, the original packet information may be retained in queue 410, and the associated information may be retained in packet information memory 430.

Packet assembler 210 may store the copied packet information and copied data in its buffer. Packet assembler 210 may obtain the associated packet data from data memory system 310 and form a single packet from the packet information and data (because the multicast count of the copied packet information is one) [act 540]. Once the packet has been formed, and because the multicast count exceeds one, processing for the particular queue may continue upon selection of that queue among the queues 410 [act 505].

If the size of the data associated with the packet information in the queue 410 does not exceed the threshold packet size, dequeue engine 420 may determine if the multicast count exceeds a count threshold [act 545]. In one implementation, the count threshold may be four, but other count thresholds are possible. One goal for load balancing that is met by such a count threshold is to access each memory bank an average of once for a given block of four cells. By keeping (packet size threshold*count threshold) a multiple of four for small packets, this load balancing goal may be met.

If the multicast count of the packet information exceeds the count threshold, dequeue engine 420 may decrement the multicast count of the packet information in queue 410 by a first number X, copy the packet information, and set the multicast count of the copied packet information to the number X [act 550]. In one implementation consistent with the principles of the invention, the number X may be, for example, four. Dequeue engine 420 may send the copied packet information and any associated information from packet information memory 430 to packet assembler 210 [act 555]. Because the packet information may be sent at least once more, the original packet information may be retained in queue 410, and the associated packet information may be retained in packet information memory 430.

Packet assembler 210 may store the copied packet information and copied data in its buffer. Packet assembler 210 may sequentially form X packets from the packet information and data stored in its buffer, because the multicast count of the copied packet information is X [act 560]. Packet assembler 210 may create a different header for each of the X packets and may decrement the multicast count with each packet creation. Once X packets have been formed, and because the multicast count exceeds one, processing for the particular queue may continue upon selection of that queue among the queues 410 [act 505].

If the multicast count of the packet information does not exceed the count threshold, dequeue engine 420 may decrement the multicast count of the packet information in queue 410 by a number Y, copy the packet information, and set the multicast count of the copied packet information to the number Y. In one implementation consistent with the principles of the invention, Y may be smaller than X (e.g., two). Y may also be chosen as the remaining multicast count of the packet information in the queue 410.

Dequeue engine 420 may send the packet information and any associated information from packet information memory 430 to packet assembler 210 [act 565]. Packet assembler 210 may store the packet information and data in its buffer. Packet assembler 210 may sequentially form Y packets from the packet information and data stored in its buffer, because the multicast count of the packet information is Y [act 570]. Packet assembler 210 may create different headers for the Y packets and may decrement the multicast count with each packet creation. Once the packets have been formed, and because Y may equal the remaining multicast count, processing is completed for the packet information at the head of the queue of interest [END in FIG. 5].

As illustrated in FIG. 5, the number of packets formed by the packet processor 210 for a packet with a size at or below the threshold packet size may be, for example, 1, Y (e.g., 2), or X (e.g., 4), depending on the number of packet copies remaining to be made (e.g., multicast count). By having packet assembler 210 replicate packets that are smaller than the count threshold, data memory system 310 is not imbalanced by, for example, multiple reads of data from a single bank of data memory system 310. Also, by keeping the amount of data sent in a dequeue operation for a single stream multicast relatively low (e.g., one copy per dequeue operation for packets larger than 4 cells, and 1/2/4 copies per dequeue operation for packets equal to or smaller than 4 cells), the QoS of the system is not substantially lowered, because higher priority packets from other queues 410 in the stream may be sent out after each smaller chunk is multicast.

Although described in the context of a purpose-built router, concepts consistent with the principles of the invention can be implemented in any system that requires high performance data item processing. Apparatuses, systems, and methods based on the principles of the memory system and packet processor described herein may be used in any environment for processing data items associated with an entity. The data items are processed using context switching for the entities. Entities may include sources of data items, as described herein, or other entities, such as destinations, processing threads, or any other entity having individual data items that must be processed.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, although principles consistent with the invention have been described using a threshold packet size of four cells to determine whether multiple packets will be sent at a time, a smaller or larger packet size threshold may be used without deviating from the principles of the invention. Also, for packet sizes at or below the packet size threshold, other numbers of packets than 1/2/4 may be sequentially assembled by the packet processor. In one implementation, for packet sizes below the threshold, for example, four copies of a packet may be made if the multicast count equals or exceeds four. In one implementation, the packet size threshold, the multicast count threshold, and the number of memory banks in the data memory system 310 may all be equal (e.g., to four, or some other number). Those skilled in the art will appreciate and design the number of packet copies made based on, for example, a tradeoff between multicast throughput and processing latency. Moreover, although the present invention is discussed in reference to single stream multicast, it is contemplated that the principles of the invention disclosed herein may also be applied to multicasting packets of information among multiple streams of data.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A method comprising:
   dequeuing buffered packet information having an associated multicast count of greater than one;
   determining whether stored packet data corresponding to the buffered packet information exceeds a first threshold;
   when the stored packet data corresponding to the buffered packet information exceeds the first threshold:
      decrementing the multicast count by one;
      copying the buffered packet information and the stored packet data, and
      forming one packet from the copied packet information and the copied packet data; and
   when the stored packet data corresponding to the buffered packet information does not exceed the first threshold and the multicast count does not exceed a second threshold, where the multicast count equals a number Y and Y is an integer greater than one:
      forming, from the buffered packet information and the stored packet data, Y number of packets.

2. The method of claim 1, when decrementing the multicast count by one reduces the multicast count to one, the method further comprising:
   subsequently dequeuing the buffered packet information; and
   forming one packet from the buffered packet information and the stored packet data.

3. The method of claim 2, further comprising:
   dequeuing other buffered packet information, where subsequently dequeuing the buffered packet information is performed after dequeuing the other buffered packet information.

4. The method of claim 1, further comprising:
   when the stored packet data corresponding to the buffered packet information does not exceed the first threshold and the multicast count exceeds the second threshold:

decrementing the multicast count by a positive integer, X,
copying the buffered packet information and the stored packet data,
setting, to X, a second multicast count associated with the copied packet information, and
forming, from the copied packet information and the copied packet data, X number of packets.

5. The method of claim 4, when decrementing the multicast count by X reduces the multicast count to one, the method further comprising:
subsequently dequeuing the buffered packet information; and
forming one packet from the buffered packet information and the stored packet data.

6. The method of claim 5, further comprising:
dequeuing other buffered packet information, where subsequently dequeuing the buffered packet information is performed after dequeuing the other buffered packet information.

7. The method of claim 1, where the threshold relates to a size of the stored packet data.

8. The method of claim 1, when the stored packet data corresponding to the buffered packet information exceeds the first threshold, the method further comprising:
setting, to one, a multicast count associated with the copied packet information.

9. A method comprising:
selecting, from a plurality of queues buffering packet information that corresponds to packet data stored in a first memory, a first one of the queues;
determining, based on the packet information buffered in the first queue, whether packet information at a head of the first queue indicates multicasting;
storing, in a second memory, when the packet information does not indicate multicasting, the packet information from the head of the first queue and the corresponding packet data from the first memory;
determining, when the packet information indicates multicasting, whether the corresponding packet data stored in the first memory exceeds a packet size threshold; and
dequeuing the packet information at the head of the first queue when the corresponding packet data stored in the first memory exceeds the packet size threshold.

10. The method of claim 9, further comprising:
determining, when the corresponding packet data stored in the first memory does not exceed the packet size threshold, whether a multicasting count associated with the indicated multicasting exceeds a multicast count threshold.

11. The method of claim 10, further comprising:
storing, in the second memory, the packet information from the head of the first queue and the corresponding packet data from the first memory when the multicasting count does not exceed the multicast count threshold.

12. The method of claim 11, where the packet information and the corresponding packet data stored in the second memory have an associated multicast count of Y, wherein Y is a positive integer, the method further comprising:
sequentially forming, at a packet assembler, Y number of packets from the head packet information and the corresponding packet data stored in the second memory.

13. The method of claim 12, further comprising:
setting the packet size threshold based on buffer space available in the packet assembler.

14. The method of claim 12, further comprising:
creating, at the packet assembler, different headers for one or more of the Y packets.

15. The method of claim 10, further comprising:
dequeuing the packet information at the head of the first queue when the multicasting count exceeds the multicast count threshold.

16. The method of claim 15, where the dequeuing comprises:
decrementing, by X, a multicast count associated with the packet information at the head of the first queue, where X is a positive integer and does not exceed the multicast count threshold,
copying the packet information and the stored packet data,
setting, to X, a multicast count associated with the copied packet information, and
storing the copied packet information and the copied packet data in the second memory.

17. The method of claim 16, further comprising:
sequentially forming, at a packet assembler, X number of packets from head packet information and the corresponding packet data stored in the second memory.

18. The method of claim 17, further comprising:
retaining the packet information at the head of the first queue after the dequeuing the packet information at the head of the first queue;
selecting a second one of the queues on which to perform dequeue operations; and
subsequently selecting the first queue for subsequently dequeuing the packet information retained at the head of the first queue after the dequeue operations are performed on the second queue.

19. The method of claim 17, further comprising:
setting the multicast count threshold based on an available number of memory banks in the packet assembler.

20. The method of claim 17, further comprising:
creating, at the packet assembler, different headers for one or more of the X number of packets.

21. The method of claim 17, further comprising:
decrementing the multicast count associated with the copied packet information each time one of the X number of packets is formed.

22. A network device comprising:
a first memory to store packet data;
an arbitrator to select a first queue from among a plurality of queues buffering packet information that corresponds to the stored packet data;
a dequeue engine to determine, based on the packet information buffered in the first queue, whether packet information at a head of the first queue indicates multicasting; and
a second memory to store, when the packet information does not indicate multicasting, the packet information from the head of the first queue and the corresponding packet data from the first memory,
the dequeue engine being further configured to:
determine, when the packet information indicates multicasting, whether the corresponding packet data stored in the first memory exceeds a packet size threshold, and
dequeue the packet information at the head of the first queue when the corresponding packet data stored in the first memory exceeds the packet size threshold.

* * * * *